United States Patent [19] [11] Patent Number: 4,797,995
Chang et al. [45] Date of Patent: Jan. 17, 1989

[54] METHOD OF FABRICATING A HOLLOW SQUARAX INNER CONDUCTOR

[75] Inventors: Stanley S. Chang, Palos Verdes Estates; Robert E. Jones, Woodland Hills; Hui Bau, Hermosa Beach, all of Calif.

[73] Assignee: Hughes Aircraft Company, Los Angeles, Calif.

[21] Appl. No.: 939,322

[22] Filed: Dec. 8, 1986

[51] Int. Cl.⁴ .............................................. H01R 43/00
[52] U.S. Cl. .................................... 29/825; 333/248
[58] Field of Search ........................ 29/825; 333/248; 174/68.5

[56] References Cited

U.S. PATENT DOCUMENTS 3,449,698  6/1969  Cooper ............................ 333/248
4,260,964  4/1981  Saul ................................ 333/248 X
4,301,430  11/1981  Stachejko ....................... 333/248 X

FOREIGN PATENT DOCUMENTS 1064889  5/1954  France ............................. 333/248

Primary Examiner—P. W. Echols
Assistant Examiner—Carl J. Arbes
Attorney, Agent, or Firm—S. M. Mitchell; M. J. Meltzer; A. W. Karambelas

[57] ABSTRACT

A method of fabricating hollow square inner conductors having precise outer dimensions is disclosed. A first "u" shaped slot (10) is machined in a base plate (12) and a cover plate (16) is then brazed to the sloted surface (18). The cover plate (16) is machined to provide a first wall (20) of desired thickness. Second and third slots (22, 24) are machined in the base plate (12) parallel to the first slot (10) on opposite sides thereof to provide second and third walls (26, 28) of the hollow conductor (38). A sacrificial metal (30) having a melting point below that of the base plate metal is cast into the second and third slots (22, 24). A fourth wall (36) is formed by machining material from the base plate face (32) opposite the slotted surface (18). The sacrificial metal (30) is then removed to provide the hollow inner conductor (38) having precise outer dimensions (A, B).

12 Claims, 1 Drawing Sheet

METHOD OF FABRICATING A HOLLOW SQUARAX INNER CONDUCTOR

BACKGROUND OF THE INVENTION

1. Field of the Invention

The invention relates generally to conductors and more specifically to a method for making hollow squarax inner conductors.

2. Background of the Invention

Satellites may generally use waveguides for conducting signals within the satellite, for example to and from antennas. Alternatively, a coaxial center conductor having a square cross section or squarax may be used. Solid inner conductors are used in current antenna squarax applications. However, for lower frequency applications in the range of 800 MHz such as high power low frequency antennas, the size of the squarax increases and the larger solid inner conductors may make squarax prohibitively heavy for satellite use where minimizing weight is a prime objective. Use of a hollow inner conductor to reduce weight is a possible solution to the problem since this would not effect electrical performance because of the phenomenon known as the electrical skin effect. But attempts at bending square tubing or attaching straight tube sections to solid curved sections has not met the strict requirements of outer dimensional tolerances and versatility critical to the use of squarax in satellite applications.

OBJECTS OF TH INVENTION

It is therefore an object of the invention to provide a method of fabricating hollow squarax inner conductors not subject to the foregoing problems and disadvantages.

It is another object of the invention to provide a method of fabricating hollow squarax inner conductors having precise outer dimensions.

It is a further object of the invention to provide a method of fabricating hollow squarax inner conductors having versatility of conductor shape and size.

It is yet another object of the invention to provide a method of fabricating hollow squarax inner conductors having planar bends.

SUMMARY OF THE INVENTION

The objects of the invention are achieved by providing a method of fabricating hollow rectangular inner conductors having precise outer dimensions. In a preferred embodiment, such conductors have a square cross section. The first step is to machine a first slot having the desired inner dimensions of the conductor in a metal base plate. A plate cover is then brazed to the slotted surface and then reduced in thickness to the desired conductor wall thickness. Second and third slots are then machined in the base plate on opposite sides of the first slot. These slots are positioned to provide the precise desired outer wall dimensions of the finished conductor. A sacrificial metal having a melting point below that of the base plate metal is then cast in the second and third slots and over the cover plate. The base plate is then flipped over and it is machined to remove material from the face opposite the slotted surface to form the fourth wall of the conductor and provide the second precise dimension of the conductor.

These and other objects of the present invention together with the features and advantages thereof will be apparent from the following drawing, figures, and detailed description of the invention when considered in conjunction with the accompanying drawings in which applicable reference numerals are carried forward.

DETAILED DESCRIPTION OF THE INVENTION

Figure 1:
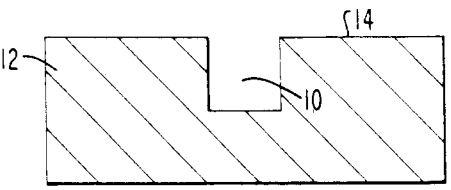
FIGS. 1-8 illustrate the fabrication steps of the present invention in cross section.

FIG. 1 shows the first step in the method of the preferred embodiment for fabricating a hollow squarax inner conductor. It will be understood by those skilled in the art that the method described herein will work equally well with hollow tubes having a rectangular cross section. A first "u" shaped slot 10 is numerical control (N/C) machined in a first surface 14 of a base plate 12. The dimensions of slot 10 are accurately controlled in order to provide the desired wall thickness of the finished square conductor. The preferred material for base plate 12 is 6061-T6 aluminum alloy although other materials could be used.

Figure 2:
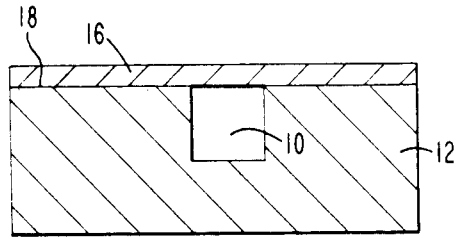
Figure 3:
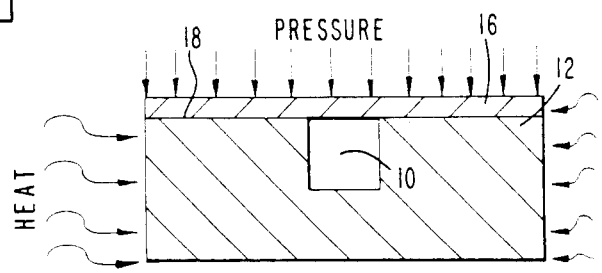

The next step, s illustrated in FIG. 2, is to apply a cover plate 16 to first surface 14 with a brazing foil 18 positioned therebetween. The preferred braze is 3003 aluminum alloy although other braze materials will work. Cover plate 16 is preferably of the same material as baseplate 12 and has a thickness greater than the final desired wall thickness for the finished squarax conductor. In preparation for brazing, the parts may be caustic etched, then immersed in an HF—HN03 solution and then vapor degreased. As shown in FIG. 3, pressure and heat are applied in a vacuum furnace to braze cover plate 16 to base plate 12. Pressure may be applied by clamping in the oven. Although foil brazing is the preferred technique, paste brazing or brazeless diffusion bonding may also be used to join cover plate 16 to base plate 12.

Figure 4:
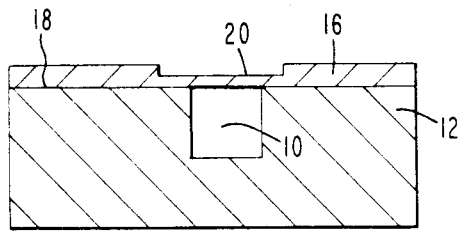

As illustrated in FIG. 4, the portion of cover plate 16 covering first slot 10 and beyond on each side by at least the desired wall thickness of the squarax conductor is N/C machined to reduce this portion of the cover plate thickness and thereby provide a first wall 20 of the conductor.

Figure 5:
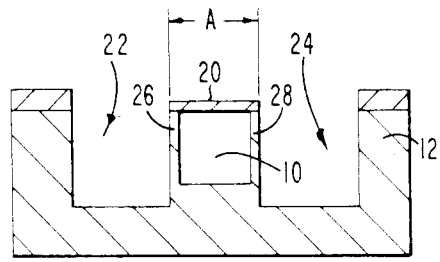

Next, as shown in FIG. 5, second and third "u" shaped slots, designated 22 and 24 respectively, are N/C machined parallel to and on opposite sides of slot 10 to define a second wall 26 and a third wall 28 of the finished conductor. The positioning of slots 24 and 26 is precise since this defines a first critical outer dimension "A" of the squarax conductor.

Figure 6:
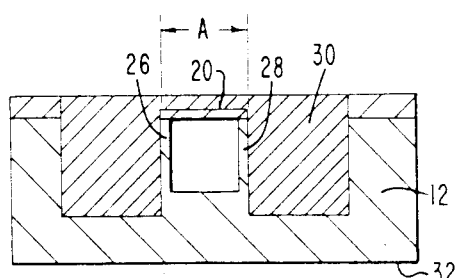

A sacrificial metal 30, such as Cerro-Bend having a low melting temperature is then cast into machined slots 22 and 24 as well as the space above first wall 20 as illustrated in FIG. 6.

Figure 8:
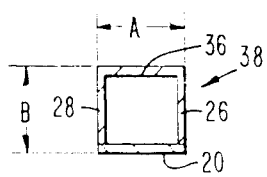
Figure 7:
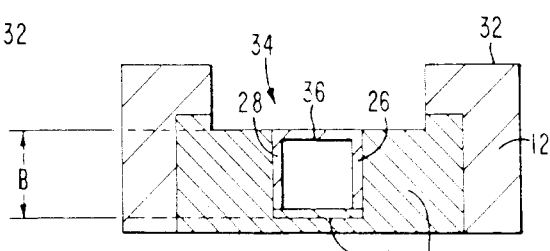

Base plate 12 is then flipped over as shown in FIG. 7 to provide a second surface 32 of base plate 12 for machining. A fourth slot 34 is then machined in base plate 12 through surface 32. The depth of slot 34 is determined to provide a fourth wall 36 of the squarax conductor having the desired wall thickness and to provide the second critical outer dimension "B". Slot 34 is somewhat wider than outer dimension "A" so that it extends into sacrificial metal 30 on each side. The part is then heated to remove sacrificial metal 30 and the remaining scrap from base plate 12 to leave the final squarax conductor 38 having critical dimensions "A" and "B" as illustrated in FIG. 8.

It should be noted that while the description has been directed to a linear hollow squarax inner conductor, the fabrication method of the present invention can be used to provide such conductors having planar bends or curves. Also, the method is adapted to provide a squarax conductor with both hollow and solid sections.

While the present invention has been shown and described with reference to a preferred embodiment, it will be understood that numerous modifications, changes, variations, substitutions and equivalents will now occur to those skilled in the art without departing from the spirit and scope of the present invention. Accordingly, it is intended that the invention herein be limited only by the scope of the appended claims.

What is claimed is:

1. A method of fabricating a hollow rectangular tube having highly accurate first and second outer dimensions comprising the steps of:
    removing material from a first surface of a metal base plate to form a first "u" shaped slot having the desired inner dimensions of said tube;
    joining a cover plate having a thickness greater than the desired wall thickness of said tube to said slotted surface of said base plate;
    removing material from the area of said cover plate covering said first slot to define a first wall of said tube having the desired thickness, said area being at least as wide as said first outer dimension;
    removing material from said base plate and any remaining portion of said cover plate to form second and third "u" shaped slots on opoosite sides of said first slot, said second and third slots being parallel to said first slot and spaced from each other to define respective second and third walls of said tube spaced at said first outer dimension and having the desired thickness, each of said second and third slots having a depth from said first wall greater than said second outer dimension of said tube;
    casting a sacrificial metal into at least said second and third slots, said sacrificial metal having a melting point lower than the melting point of said base plate metal;
    removing sufficient material from a second surface of said base plate opposite said first plate surface to form a fourth wall of said tube having the desired thickness and thereby exposing said fourth wall to a width of at least said first outer dimension; and
    heating the remaining portion of said base plate and said sacrificial metal to remove unwanted portions of said base plate and sacrificial metal and thereby form said hollow rectangular tube.

2. The method of claim 1 wherein said tube has a square cross section.

3. The method of claim 1 wherein the steps of removing material comprise numerical control machining.

4. The method of claim 1 wherein the step of joining said cover plate to said slotted surface comprises foil brazing.

5. The method of claim 1 wherein the step of joining said cover to said slotted surface comprises paste brazing.

6. The method of claim 1 wherein the step of joining said cover plate to said slotted surface comprises brazeless diffusion bonding.

7. The method of claim 1 wherein said tube comprises a hollow squarax inner conductor for a satellite antenna.

8. The method of claim 1 wherein said tube includes nonlinear sections.

9. The method of claim 8 wherein said nonlinear sections include planar bends.

10. The method of claim 1 wherein said cover plate and said base plate comprise aluminum.

11. The method of claim 1 wherein said base plate has a substantially rectangular cross section.

12. A method of fabricating a hollow squarax inner conductor having highly accurate first and second outer dimensions comprising the steps of:
    machining a first "u" shaped slot in a first surface of a substantially rectangular metal base plate, said first slot having a depth and width approximately equal to the desired inner dimensions of said conductor;
    foil brazing a cover plate having a thickness greater than the desired wall thickness of said conductor to said slotted surface of said base plate to provide a substantially square inner cross section of said squarax conductor;
    machining material from the area of said cover plate covering said first slot to define a first wall of said squarax conductor having the desired thickness, said area being at least as wide as said first outer dimension;
    machining second and third "u" shaped slots on opposite sides of,said first slot through any remaining portion of said cover plate and into said base plate, said second and third slots being parallel to said first slot and spaced from each other to define respective second and third walls of said tube spaced at said first outer dimension and having the desired thickness, each of said second and third slots having a depth from said first wall greater than said second outer dimension of said tube;
    casting a sacrificial metal having a melting point lower than the melting point of said base plate metal into at least said second and third slots;
    machining sufficient material from a second surface of said base plate opposite said first plate surface to form a fourth wall of said squarax conductor of the desired thickness and to expose said fourth wall to a width of at least said first outer dimension; and
    heating the remaining portion of said base plate and said sacrificial metal to remove unwanted portions of said base plate and sacrificial metal and thereby form said hollow squarax inner conductor.

* * * * *